Jan. 3, 1950     E. W. DOWER     2,493,233
PLUG GAUGE
Filed Dec. 27, 1944
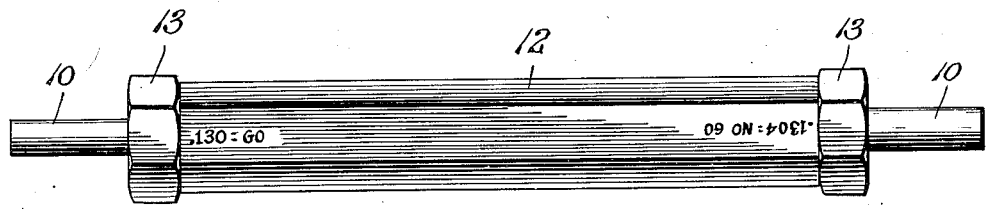
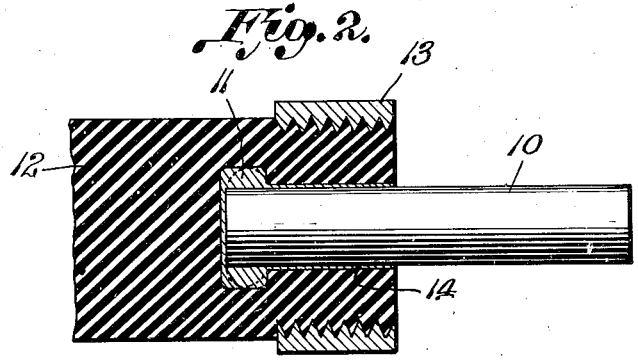
Inventor
Edward W. Dower
Attorneys Patented Jan. 3, 1950

2,493,233

UNITED STATES PATENT OFFICE 2,493,233

PLUG GAUGE

Edward W. Dower, Elgin, Ill., assignor to Elgin National Watch Company, Elgin, Ill., a corporation of Illinois Application December 27, 1944, Serial No. 569,953

3 Claims. (Cl. 33—178)

This invention relates to a plug gage which can be easily and accurately made, and which is not subject to breakage or to tendency to deform the article to be gaged or itself undergo deformation or major wear.

Plug gages are employed by inserting the gage member into a hole whose size and accuracy is to be determined by a linear movement: and a reverse linear movement is used to withdraw the gage. Particularly with small holes, it is difficult for the operator to assure that the gage will enter and leave truly in the line of the axis of the aperture, as cocking easily occurs, wherewith severe strains are produced upon the gage as well as upon the article, so that breakage may occur, or rapid wear be induced and deformation occasioned. It is obviously desirable to make the plugs of highly wear-resistant materials but such materials are brittle and cannot endure heavy bending strains, particularly as these strains are determined by the operator's strength and skill and not by the size of the plug.

Further, it is difficult to make and support the gages of small sizes, say from 0.250 inch downward. This is particularly true since small gages may be designed to work to such close tolerances that binding occurs, and hence when the gage is made of uniform cross-section the necessary length incurs a corresponding probability of breakage. When it is sought to make the gages of other than regular cross-section, difficulty is encountered preparing them accurately to the calibrated section.

This invention is concerned with a gage having a mounting for the plug itself, wherewith the plug is supported for introduction and removal and the handle member permits flexibility so that pulls or pushes which are not in line with the axis do not cause breakage, and so that the handle may be given a force couple in an axial plane without over-straining the plug itself.

This assembly is particularly valuable with plugs made of the highly wear-resistant refractories, as it permits forming the plug of uniform diameter, of binding it to the handle member against separation, and of assuring the plug against breakage even under severe conditions of employment.

An illustrative form of practicing the invention is shown in the accompanying drawings:

Figure 1 is a side elevation of a double-ended plug gage according to this invention.

Figure 2 shows in part a longitudinal sectional view through one of the gage sections.

In the drawings, the gage element or plug 10 is of rigid material, illustratively being of corundum which is a highly wear-resistant refractory of fixed dimensions and physical properties, being known in various forms as sapphire, ruby, etc. In practice, it has been found that synthetic sapphire rods may be ground and polished over their entire lengths to give a uniform diameter of cross-section, and by controlling the abrasive and polishing operations, with use of fine polishing powder, chemical polishing or flame polishing, the plug can be brought accurately to the desired dimension even when the tolerances to be gaged are of the order of a ten-thousandth of an inch or less. In the illustrative example of Figure 1, one of the plugs 10 is shown as having a diameter of 0.130 inch and the other plug a diameter of 0.1304 inch so that the double-ended gage is capable of determining whether the hole lies between these two extremes of dimension. Gages as small as 0.040 inch in diameter and having an exposed length of 0.120 inch, or smaller, can be thus made.

In the illustrative form of practice, the inner end of the plug, being that spaced from the gaging end, is provided with a collar 11 formed of a material which bonds directly to sapphire and like corundum pieces.

This assembly is then surrounded by a handle 12 which preferably is of angular section such as a hexagon or octagon. While various types of rubber may be employed for flexibility, it is preferred to employ a synthetic rubber because of its freedom from deterioration when in contact with oil, etc. In gages which have been made, a synthetic rubber made by a polymerizing condensation of chlorobutadiene, known as "neoprene," has been employed in a hardness of 70 to 80 Duro units. That is, the material has the properties of a soft rubber (ASTM test designation D–676–42T). The handle 12 may be formed as a separate unit having bores into which the gage assemblies are inserted. Preferably, the ends of the handle are reduced in diameter and of circular section, and have a screw thread molded thereon.

Among the bonding materials which have been found useful are the synthetic plastic known as nylon (for example nylon D), ester gum, shellac, and sealing wax, of which sealing wax is presently preferred. The preformed plug is dipped into the liquid bonding agent, for example in the form of a solution, and then inserted into the bore provided in the handle pieces. When the solution of the bonding agent in a solvent has been induced by heat, it is preferred to heat the assembly to effect bonding to the handle. When sealing wax is employed, it is preferred to melt the sealing wax by heat, dip the inner end of the plug into the wax for the distance by which the plug is to be introduced: a collar of wax is permitted to form by cooling and again dipping for the axial length of the collar, this redipping being accomplished until the desired outer diameter is obtained. The cold plug with its collar and coating is then inserted into the handle, and heat is applied to the assembly to cause remelting of the wax and its bonding to the material of the handle for the entire embedded length as indicated by the film 14 in Figure 2. With small sizes of gages, it is feasible to omit the collar formation and therewith the recess at the inner end of the handle bore.

It is prferred to complete the gage by employing a ferrule formed as a nut 13 which may be of metal or other form-retaining material capable of resisting expansion of diameter. It is preferred to form threads on its inner surface, so that the ferrule 13 may be threaded upon the tapered reduced end of the gage handle (see Fig. 2) and thus tightly engage and hold the rubber under compression, and also provide a means for exerting a withdrawing tension upon the gage during use. The effect of the ferrule is to compel the material at the end of the handle to move with the gage plug as the latter shifts from coaxial position, and thus prevent tension strains across the bonding interfaces. When a collar 11 is used, it will also be noted that the ferrule acts mechanically to prevent disengagement so long as the collar remains bonded to the plug. When the ferrule is larger than the body of the handle, as illustrated, it is preferred to have at least one ferrule formed with flat peripheral faces to prevent rolling.

In use, the gage can be held by the hand at the end opposite the gage plug 10 which is to be employed, and this plug is then introduced to the hole to be gaged. The flexibility of the handle permits the plug to conform to the true axis of the hole and hence the introduction can be performed without accurately aligning the gage. In withdrawing the gage, it will be noted that any rocking performed by the operator is relieved by the flexibility in the handle, so that the gage is not broken within the hole.

It is to be understood that the invention can be employed in many ways other than in the illustrative way, within the scope of the appended claims.

What is claimed is:

1. A gage comprising a rigid plug of uniform calibrated cross-section, a separate collar having a bonding connection to said plug at a point spaced from the gaging end of said plug, and a flexible rubber handle surrounding and closely conforming to said collar and the non-gaging part of the plug and engaging said collar whereby pulls on the handle are transmitted to the plug.

2. A gage comprising a corundum plug of uniform calibrated cross-section, a collar having a bonding connection to said plug adjacent the non-gaging end, a flexible rubber handle surrounding and engaging said collar whereby pulls on the handle are transmitted to the plug, said handle having a reduced end where it surrounds said collar and the non-gaging part of said plug, and a form-retaining ferrule tightly engaged with said reduced end and effective to hold the material thereof closely pressed upon a part of the plug outward of said collar.

3. A gage comprising a corundum plug of uniform calibrated cross-section, a flexible rubber handle having a reduced threaded end surrounding a part of said plug, a layer of bonding material adherent to the plug and to the handle and effective to secure the embedded portion of the plug to the handle, and a form-retaining ferrule with an integral thread engaged with the handle thread and in compressing relationship with the material of the handle end, said ferrule being of larger external diameter than the body of said handle and having flat peripheral faces.

EDWARD W. DOWER.

REFERENCES CITED

The following references are of record in the file of this patent:

UNITED STATES PATENTS

| Number | Name | Date |
|---|---|---|
| 264,527 | Haley | Sept. 19, 1882 |
| 264,798 | Tyler | Sept. 19, 1882 |
| 2,043,442 | McNeil | June 9, 1936 |
| 2,173,942 | Hiatt | Sept. 26, 1939 |
| 2,197,756 | Brescka et al. | Apr. 23, 1940 |
| 2,345,749 | Hohwart | Apr. 6, 1944 |
| 2,345,750 | Hohwart | Apr. 6, 1944 |

OTHER REFERENCES

American Mach., June 8, 1944, page 132.